United States Patent [19]

Kedem

[11] Patent Number: 5,240,579
[45] Date of Patent: Aug. 31, 1993

[54] ELECTRODIALYSIS REVERSAL PROCESS AND APPARATUS WITH BIPOLAR MEMBRANES

[75] Inventor: Ora Kedem, Rehovot, Israel

[73] Assignee: Yeda Research and Development Company Ltd., Rehovot, Israel

[21] Appl. No.: 850,467

[22] Filed: Mar. 11, 1992

[30] Foreign Application Priority Data

Mar. 14, 1992 [IL] Israel .................................. 97543

[51] Int. Cl.[5] ............................................. B01D 61/44
[52] U.S. Cl. ................................ 204/182.4; 204/182.5; 204/151; 204/301
[58] Field of Search ................ 204/182.4, 151, 301, 204/182.5

[56] References Cited

U.S. PATENT DOCUMENTS

| | | | |
|---|---|---|---|
| 2,629,690 | 2/1953 | Bauman et al. | 210/24 |
| 3,562,139 | 2/1971 | Leitz | 204/182.4 |
| 3,654,125 | 4/1972 | Leitz | 204/301 |
| 3,705,846 | 12/1972 | Kato et al. | 204/182.4 |
| 3,976,569 | 8/1976 | Sheppard et al. | 210/23 F |
| 4,226,688 | 10/1980 | Kedem et al. | 204/182.4 |
| 4,569,747 | 2/1986 | Kedem et al. | 204/301 |
| 4,806,219 | 2/1989 | Yamamoto et al. | 204/182.4 |

FOREIGN PATENT DOCUMENTS 63-291608  11/1988  Japan.

Primary Examiner—John Niebling
Assistant Examiner—Arun S. Phasge
Attorney, Agent, or Firm—Helfgott & Karas

[57] ABSTRACT

Water softening by a combination of electrodialysis and calcium carbonate precipitation. The hard feed water or alternatively recycled soft water is rendered alkaline and is then subjected to a treatment by which precipitation of calcium carbonate is induced. One way of bringing about such precipitation consists in passing the alkaline water across a cake of calcium carbonate crystals having a size not exceeding 100 microns, deposited on a filter and being in an at least fifty fold excess over the amount of calcium carbonate to be precipitated.

12 Claims, 3 Drawing Sheets

ELECTRODIALYSIS REVERSAL PROCESS AND APPARATUS WITH BIPOLAR MEMBRANES

FIELD OF THE INVENTION

The present invention concerns softening of hard water by the removal therefrom of calcium values in the form of a calcium carbonate precipitate, and provides an improved water softening method suitable for both industrial and domestic applications.

BACKGROUND OF THE INVENTION AND PRIOR ART

Softening of hard water by the removal of calcium values therefrom is required for both industrial and household use to decrease scale formation in equipment such as boilers, hot water pipes and appliances such as pots and kettles, and also for the decrease of detergent consumption in household machines such as dishwashers and laundry washing machines. Softening of water is, moreover, effected as a pre-treatment for water desalination.

The factors to be considered in the choice of a water softening process include the raw water quality, the end use and desired quality of the soft water for such use, the ways and costs of disposing the waste streams, ecological problems associated with the process in general and with the waste disposal in particular, and the versatility of the process and its adaptability to different processing scales.

In all known water softening processes in which calcium carbonate is precipitated lime or alkali such as, for example, sodium hydroxide has to be added to the feed hard water. To avoid the handling of excessively large volumes, concentrated aqueous alkali solutions, e.g. caustic soda solutions are used. However, the handling of concentrated caustic soda or other equivalent alkaline solutions is inconvenient and hazardous and may be unsuitable for various industrial and domestic applications. It is therefore an object of the present invention to provide an alternative process for softening hard water by the precipitation of calcium carbonate therefrom, which does not require the addition of an alkali.

Water desalination by electrodialysis has been practised for many years. Generally speaking, the process is carried out in an apparatus, often referred to as a stack, in which a plurality of cation-selective and anion-selective membranes are placed alternatingly to form diluate and concentrate compartments alternating with each other. In operation, salt anions and cations such as, for example $Na^+$ and $Cl^-$, are drawn from each diluate compartment to the flanking concentrate compartments, the cations into one and the anions into the other. The desired product desalted water is withdrawn from the diluate compartments while the brine withdrawn from the concentrate compartments is rejected.

It has already been suggested to use for electrodialysis so-called asymmetric bipolar membranes, i.e. membranes having each an anion-exchange layer and a cation-exchange layer of unequal permselectivity combined in a single unit. Membranes of this kind are described, for example, in U.S. 3,562,139 (Leitz). Leitz also describes a method and apparatus for desalination wherein alternatingly oriented bipolar ion exchange membranes define the individual chambers of an electrodialysis apparatus and wherein the anion exchange laminae of each pair of said membranes bound the diluate chambers and the cation-exchange laminae bound the concentrate chambers. Leitz describes an electrodialysis processes with periodic reversal of the current flow by which fouling the membranes might be suppressed.

U.S. 4,217,200 (Kedem et al.) and U.S. 4,569,747 (Kedem et al.) describe sealed electrodialysis cells comprising two different monopolar membrane units, one being a cation-exchange and the other anion-exchange membrane, attached with each other along the peripheral regions and provided with means for the ingress and egress of liquid. In accordance with the disclosure in these two patents such membrane bags are used as concentrate compartments in electrodialysis stacks.

It is the object of the present invention to provide a process and apparatus for the softening of hard water by the precipitation therefrom of calcium carbonate, using an electrodialytic water splitting process for the alkalinization of the hard feed water, thereby to bring about the precipitation of calcium carbonate therefrom.

SUMMARY OF THE INVENTION

The present invention is based on the realisation that crystallization of calcium carbonate from hard water by mere alkalinization is slow, in spite of over-saturation, because of a very slow crystal growth. This is so because supersaturation may be maintained and spontaneous nucleation yields initially a small amount of crystals in solution which are inherently dilute, and thus the chance of crystal growth by deposition of ions on the already formed crystals is small. It has further been realised, in accordance with the present invention, that due to such delay in crystallization it is possible to render hard water alkaline by electrodialysis, to withdraw the so-alkalinized water from the diluate cells without any significant precipitation of calcium carbonate, to mix the withdrawn alkaline water with fresh hard water and subject the resulting alkaline diluate to a crystallization inducing treatment without the need to add any extraneous alkali.

Based on these observations the present invention provides a process for the softening of hard water by the precipitation therefrom of an amount of calcium carbonate and separate withdrawal of precipitated calcium carbonate and soft water, characterized in that feed hard water is rendered alkaline by electrodialysis against a brine containing a water soluble alkali metal or calcium salt with periodical current reversal, using an apparatus comprising alternating product and brine compartments within a stack of asymmetric bipolar ion-exchange membranes so arranged that each brine compartment is bound by two cation-exchange layers and each product compartment is bound by two anion-exchange layers, which asymmetric bipolar ion-exchange membranes are of a kind which when the anion-exchange layer thereof faces a cathode the rate of delivery of anions into a compartment distal from the cathode exceeds the rate of delivery of cations in the opposite direction and when the anion-exchange layer faces the anode $H^+$ and $OH^-$ ions are generated; and alkaline hard water is withdrawn from the stack and mixed with fresh hard water to produce an alkane diluate, which diluate is subjected to treatment by which calcium carbonate precipitation is induced; and mother liquor from such precipitation is recovered as product soft water.

The method of softening hard water according to the invention thus involves a unique combination of electrodialysis and calcium carbonate precipitation.

In a preferred embodiment of the invention the brine compartments in said stack of asymmetric bipolar membranes are in the form of a sealed cells consisting each of two asymmetric bipolar membranes of the kind specified whose cation-exchange layers face each other, attached with each other along the peripheral regions, which cells are fitted with means for the ingress and egress of liquid.

When a current is passed through metal electrodes immersed in aqueous solution, electrolysis takes place and the solution near the cathode becomes basic and near the anode, acidic. With brackish or tap water containing chloride and calcium salts, free chlorine develops near the anode and precipitates are formed on the cathode. In ordinary electrodialysis, i.e. without current flow reversal, fast rinsing of the electrode compartments with suitable solutions is necessary, and while the problems are mitigated upon periodic current reversal, it is still necessary to remove products from the vicinity of the electrode.

From U.S. 4,226,688 it is known that these problems can be overcome by providing in both the cathode anode compartments a slurry of active carbon. The apparatus used in accordance with U.S. 4,226,688 is not of the current reversal type and consequently the active carbon which gradually becomes saturated with the electrosorbed products developing near the cathode and anode has to be regenerated. In accordance with the teachings of that U.S. patent, this is achieved by circulating the slurry between the anode and cathode compartments. However, where the current flow is periodically reversed, the active carbon is automatically regenerated and such a circulation is not required.

Thus, in accordance with a preferred embodiment of the invention the cathode and anode compartments comprise an amount of active carbon. By one mode of this embodiment both electrodes of the stack are filled with granular active carbon. By another mode active carbon is slurried in the cathode and anode compartments.

For the stability of the active carbon, the pH in the electrode compartment should preferably not exceed 6. Accordingly, when providing active carbon in the electrode compartments by either of the above modes, both electrode compartments are preferably sealed off by means of an asymmetric bipolar membrane having an acid blocking anion-exchange layer facing the electrode.

In our U.S. patent application No. 642,207 of Jan. 16, 1991 we are describing a water softening process in which the hard feed water is rendered alkaline by the addition of an alkali and calcium carbonate precipitation is accelerated and occurs within 2 to 60 seconds, in which the precipitation is performed in the presence of calcium carbonate crystals of a size not exceeding 100 microns and which are in a large excess over the amount of calcium carbonate to be precipitated from the alkaline hard water.

Thus, in one of its preferred embodiments, the present invention provides an integrated process for softening hard water of the kind described hereinbefore, characterized in that calcium carbonate precipitation is induced from alkaline water withdrawn from said stack of asymmetric bipolar ion-exchange membranes by passing the alkaline water, if desired in admixture with fresh hard water, across a cake of calcium carbonate crystals of a size not exceeding 100 microns deposited on a filter and which are in at least fifty fold excess over the amount of calcium carbonate to be precipitated from said alkaline hard water which cake of calcium carbonate crystals is continuously or intermittently disintegrated and reconstituted, and an aqueous mother liquor passing across the filter is withdrawn as product soft water.

When in this embodiment the alkaline hard water is passed across the calcium carbonate crystal cake on the filter, calcium carbonate is precipitated.

Various embodiments of calcium carbonate precipitation from alkaline hard water and of acidically disintegrating and reconstiting the calcium carbonate crystal cake on the filter are more fully described in our U.S. 642,207 of Jan. 16, 1991, which disclosure is hereby incorporated by reference.

In the course of operation the acidity of the acidic solution withdrawn from the brine compartments of said stack of asymmetric bipolar membranes increases to an extent where unless the solution is neutralized it cannot be recycled and must be rejected. In accordance with one embodiment of the invention filtered off calcium carbonate is fed into a neutralization unit together with acidic solution withdrawn from the brine compartments of the stack and a neutralized solution is recycled from said neutralization unit into the brine compartments of the stack.

The invention also provides an installation for softening hard water by the precipitation therefrom of an amount of calcium carbonate and separate withdrawal of precipitated calcium carbonate and soft water, which installation comprises:

(i) an electrodialysis apparatus comprising product and brine compartments within a stack of asymmetric bipolar ion-exchange membranes so arranged that each concentrate compartment is bound by two cation-exchange layers and each diluate compartment is bound by two anion-exchange layers, which asymmetric bipolar ion-exchange membranes are of a kind which when the anion-exchange layer thereof faces a cathode the rate of delivery of anions into a compartment distal from the cathode exceeds the rate of delivery of cations in the opposite direction and when the anion-exchange layer faces the anode $H^+$ and $OH^-$ ions are generated;

(ii) means for feeding water into the product compartments of the stack and means for the withdrawal of alkaline water therefrom;

(iii) means for mixing the withdrawn alkaline water with fresh hard water to produce an alkaline diluate;

(iv) means for feeding into the brine compartments of the stack brine containing a water soluble alkali metal or calcium salt and means for the withdrawal of brine therefrom;

(v) means for the periodic reversal of electric current flow across the stack;

(vi) a precipitation unit comprising a cake of calcium carbonate crystals of a size not exceeding 100 microns deposited on a filter and which are in an at least fifty fold excess over the amount of calcium carbonate to be precipitated from said alkaline diluate;

(vii) means for passing said alkaline diluate across said calcium carbonate cake and filter;

(viii) means for the withdrawal of a soft water filtrate; and (ix) means for collecting filtered off calcium carbonate.

In a preferred embodiment of an installation according to the invention the brine compartments in said stack of asymmetric bipolar membranes are each in the form of a sealed cell consisting of two asymmetric bipolar membranes of the kind specified whose cation-exchange layers face each other, attached with each other along the peripheral regions, which cells are fitted with means for the ingress and egress of liquid.

DESCRIPTION OF THE DRAWING

In the following the invention will be described among others and by way of example only without any limitation, with reference to the attached drawings in which.

SPECIFIC DESCRIPTION OF THE INVENTION

The feasibility of the process according to the invention was demonstrated by experiments described in the following examples:

Example 1

Figure 1:
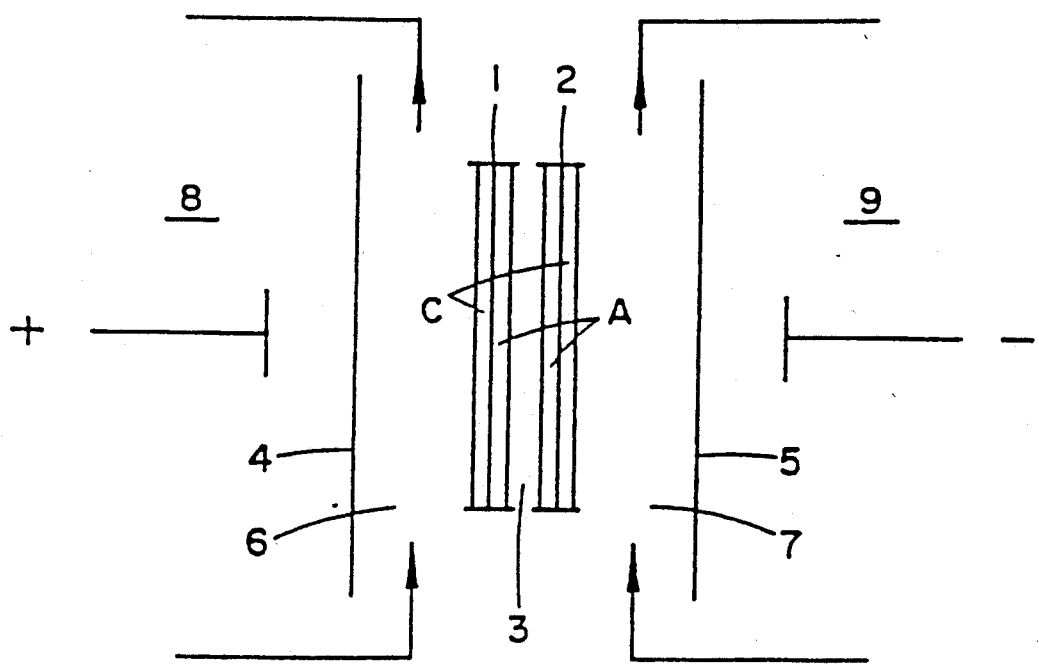
FIG. 1 is a diagrammatic illustration of a layout for a feasibility test.

The experimental set-up used is shown in FIG. 1.

Two asymmetric bipolar membranes 1 and 2 of the kind specified were put in a small flow-test cell with the two anode layers A facing each other to form a product compartment 3 and the two cathode layers C turned away towards two flanking cation-exchange membranes 4 and 5, forming with them two brine compartments 6 and 7. On the distal side of membranes 4 and 5 were two electrode compartments 8 and 9 which contained the electrodes. The exposed membrane area was in each case 15cm$^2$.

One liter of tap water having a combined calcium and magnesium ion concentration of 7.30 meq/lit was circulated through the product compartment 3, and 1 liter of a 0.1N NaCl solution was circulated through both brine compartments 6 and 7. A current of 15mA/cm$^2$ was passed through the cell. After 18 minutes a precipitate appeared in the tap water. After 8 more minutes the current was interrupted, the tap water filtered and subjected to analysis which showed that the combined Ca+Mg concentration had dropped to 2.12 meq/lit.

In similar consecutive experiments the direction of the current was reversed for each experiment.

Example 2

Asymmetric bipolar membranes of the kind specified were tested for their performance in the manner described in Example 1 and in these experiments at least 1.3 equivalents of Ca+Mg were removed from the treated water per faraday of current passed.

Subsequently, membrane pairs were formed into cells by sealing them to each other along the edges with both anode layers to the outside. The outer dimensions were 6×20 cm which provides for a total area of 120 cm$^2$ and an available area of 94 cm$^2$. A Vexar (trademark) spacer of 0.55 mm thickness was included in each cell and inlet and outlet tubules were sealed into the narrow edges and flexible rubber tubes were attached to these tubules. Twelve of these cells were assembled into a stack, separated by Vexar (trademark) spacers of 1.2 mm. thickness. The bottom and top outlets were collected and potted respectively through bottom and top of the stack vessel. Inlet and outlet were provided in the stack vessel for free rapid flow of the treated water between the bags.

Figure 2:
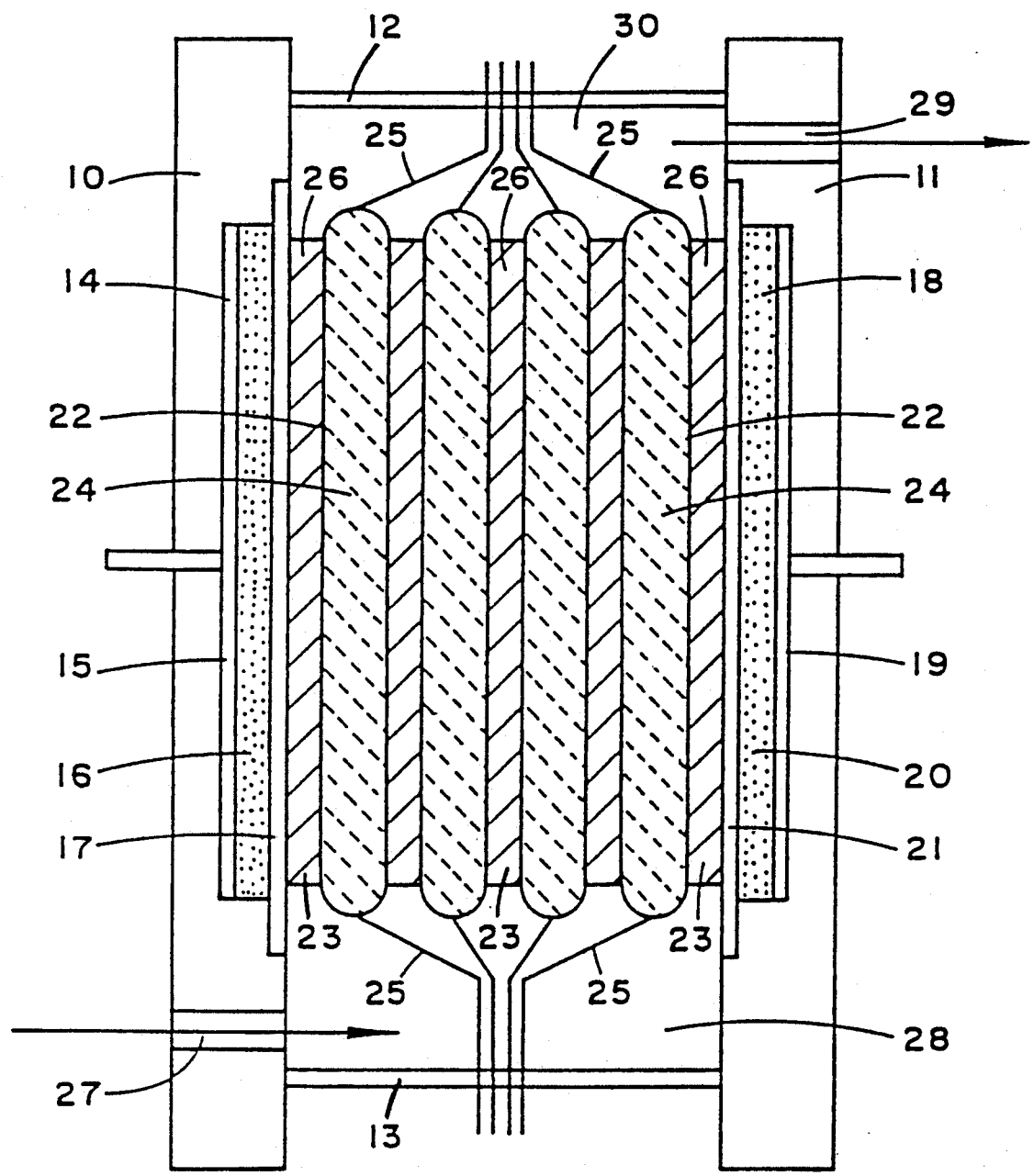
FIG. 2 is a diagrammatic illustration of a stack for use in the performance of the invention.
Figure 3:
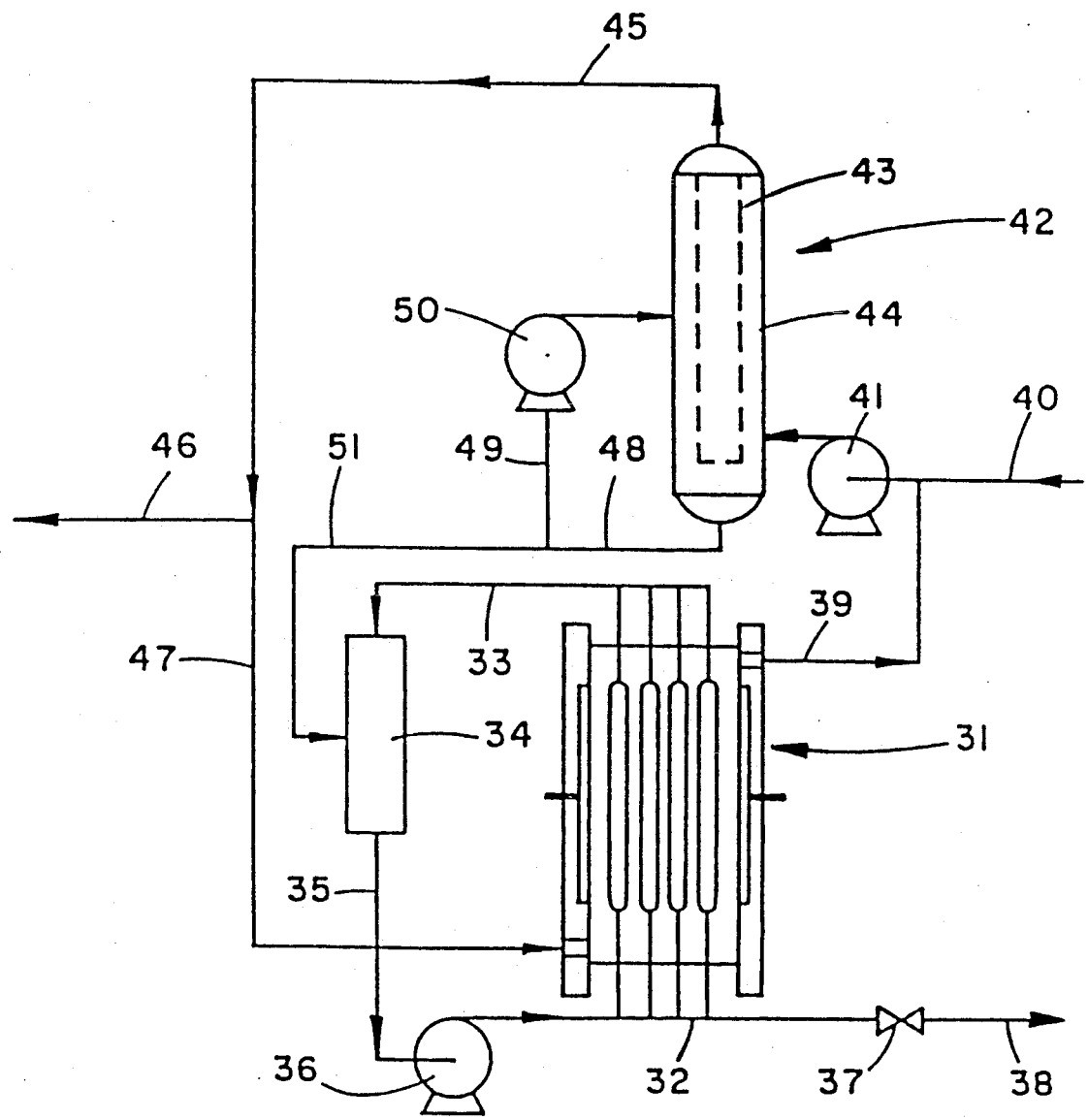
FIG. 3 is a diagrammatic illustration of an installation for use in the performance of the invention.

The stack is diagrammatically illustrated in FIG. 2

As shown, the stack is located within a casing with side walls 10 and 11, top wall 12 and bottom wall 13. Side wall 10 holds a first electrode compartment 14 comprising an electrode 15 and a granular active carbon filler 16 and being bounded by a membrane 17. Likewise, side wall 11 holds a second electrode compartment 18 comprising an electrode 19 and granular active carbon filler 20 and being bounded by a membrane 21.

The stack here shown comprises four brine compartments 22 and five product compartments 23. Each brine compartment 22 is in form of a sealed cell made of two asymmetric bipolar membranes sealed along the edges with their A-layers outside and their C-layers inside. Compartments 22 hold internal spacers 24 and are fitted with tubules 25 for the ingress and egress of brine. There are further provided intracellular spacers 26 which constitute the product cells 23.

A feeding port 27 in side wall 10 leads into a feed chamber 28 and a withdrawal port 29 in side wall 11 leads from a product delivery chamber 30. Any liquid in chambers 28 and 30 is in direct contact with, respectively, the lower and upper ends of product cells 23.

During a first operation without current reversal, the granular active carbon fillers 16 and 20 were replaced by a 2.5% suspension of active carbon which was circulated between electrode compartments 14 and 18 in a manner described in U.S. 4,226,688 and 30 lt. of tap water were circulated through the diluate compartments 10 at a rate of approximately 20 cm/sec. A brine containing 0.1N NaCl and 0.1N NaHCO$_3$ was circulated through bags 11 at a rate of approximately 2 cm/sec. A current of 15 meq/sq. cm. was passed and after 15 minutes the operation was interrupted and the treated water was filtered. It was found that the total hardness had decreased from 8.0 meq/lit of Ca+Mg to 2.6 meq/lit.

Example 3

A stack according to FIG. 2 holding 10 cells was used. The cells were separated from each other by vertical strips fastened to the cells at the bottom edge instead of the conventional spacers and this very open arrangement had the advantage that small quantities of precipitate would not cause any clogging.

In this experiment the electrode compartment contained granulated active carbon. 20 liters of tap water were circulated through the product compartments 23 at a velocity of approximately 25 cm/sec. and 2 liters of brine containing 0.1N NaCl and 0.1N NaHCO$_3$ were circulated through the brine compartments 22 at a rate of about 2 cm/sec. A current of 1.45 A was passed. In consecutive 15 minute runs in each of which 20 liter of tap water was processed, the resulting alkaline hard water was left to stand for 5 hrs and then filtered. The direction of the current was reversed for each run.

Total hardness (Ca+Mg) in the tap water was 8.0 meq/lit. Average residual hardness (Ca+Mg) in the processed water was 2.4 meq/lit. The concentration of Mg in the tap water was 1.9 meq/lit, and in the processed water it was found to be 1.7 meq/lit. In this and other precipitation runs the Mg concentration remained nearly unchanged.

Example 4

20 liters of softened tap water (ca+Mg=1.76 meq/lit) was further processed in the bipolar membrane stack of Example 3, to bring the pH up to above 11. Two liter volumes of this solution were mixed with different volumes of tap water containing 8 meq/lit (Ca+Mg). The results are shown in Table 1.

TABLE 1

| Volume Ratio sol/tap | Final Parameters pH | Ca + Mg meq/lit |
|---|---|---|
| 2 | 9.7 | 1.36 |
| 1 | 9.0 | 2.16 |
| ½ | 8.2 | 4.16 |

The time dependence of precipitation was shown in the experiment below: To 100 ml of tap water containing 8.0 meq/lit of Ca+Mg was added a given volume of treated water at pH 11. The table shows the pH and remaining total hardness in the mixed solution, after a given precipitation time.

TABLE 2

| Volume of Added tap water, ml | Final Parameters pH of Mixture | Ca + Mg meq/lit | Precipitation Time, hrs |
|---|---|---|---|
| 70 | 9.2 | 4.8 | ≈0 |
| 70 | 9.0 | 4.32 | 3 |
| 80 | 8.7 | 3.16 | 4 |
| 90 | 8.9 | 3.08 | 4 |
| 100 | 9.4 | 4.2 | ½ |
| 100 | 9.3 | 4.0 | 1 |
| 100 | 9.0 | 2.52 | 4 |

Example 5

A stack of the kind shown in FIG. 2 was operated continuously, in a feed and bleed mode.

The stack was connected to a vessel containing 16 liters of hard tap water (8 meq/lit Ca+Mg). The water was continuously circulated through the product cells and back to the vessel at a rate of 10 lit/min. A brine contgaining 0.25N NaHCO$_3$ was circulated through the brine cells at a rate of about 2 cm/sec. A current of 1.45 A was passed. After 15 min, tap water was added continuously to the vessel, and an equal volume was discharged by overflow both at a rate of approximately 1 liter/minute. The average hardness of the stream discharged from the vessel was 2.5 meq/lit.

Attention is now directed to the drawing which is a diagrammatic illustration of an installation for water softening in accordance with the invention. As shown, the installation comprises an electrodialysis stack 31 of the kind illustrated in FIG. 2 and described hereinabove with reference thereto. The brine compartments are fed with circulating brine from a large diameter inlet tube 32 and brine is withdrawn via a withdrawal manifold 33. Tube 32 and manifold 33 are connected to each other via a neutralization column 34, a duct 35 and a pump 36. Tube 32 is connected via a valve 37 to a waste withdrawal duct 38.

Alkaline product solution is withdrawn via a product withdrawal duct 39 which is connected to a duct 40 which supplies fresh hard water whereby alkaline product water withdrawn from the stack and fresh hard water are mixed. A pump 41 feeds this mixture into an aggregate 42 which holds a precipitation unit, separator means and collector unit as herein defined. The precipitation unit is in form of layers of calcium carbonate crystals of a size not exceeding 100 microns (not shown) applied to the outside of a filter 43, serving as separator means and enclosed within a tower 44 serving as collector unit. A duct 45 serves for the withdrawal of soft water from within filter 43, for delivery as product via duct 46. Part of the product soft water is tapped off by a duct 47 and is recycled as feed into product compartments of the electrodialysis stack 31.

A duct 48 serves for the withdrawal of a calcium carbonate slurry collecting at the bottom of collector unit 44 and duct 49 and pump 50 serve for recycling such slurry. A duct 51 serves for tapping off some of the withdrawn calcium carbonate slurry and flowing it into the neutralization unit 34 together with brine withdrawn from the brine compartments of stack 31.

In operation fresh hard water is fed into the installation via duct 40 and is mixed with alkaline product solution withdrawn from stack 31 via duct 39. Assuming the pH of the withdrawn alkaline water to be about 11, then practically all the HCO$_3^-$ ions present in the hard water have converted into CO$_3^{+-}$ ions, most of the Ca$^{++}$ ions having been removed before, with the consequence that no precipitation occurs. When this alkaline solution is mixed with fresh hard water arriving via duct 40 and containing Ca$^{++}$ and HCO$_3^-$ ions, CaCO$_3$ may precipitate upon proper induction. Such induction takes place on filter 43 by the action of the calcium carbonate layer thereon. The filtrate soft water withdrawn from within filter 43 via duct 45 is split: some of it is delivered as product via delivery duct 46 while the balance is recycled via duct 47 into stack 1.

In the course of operation excess calcium carbonate is withdrawn from collector 42 via duct 48. The bulk is recycled via duct 49 and pump 50 and the balance is charged via duct 51 into neutralization unit 34 for the neutralisation of the acidic solution withdrawn from the brine compartments of stack 31. An essentially clear brine is withdrawn from neutralization unit 34 and is partly recycled into stack 31 while the balance is withdrawn via waste withdrawal duct 38.

It is thus seen that in this embodiment the alkaline brine in the stack 31 is produced from recycled soft water and not from feed hard water.

I claim:

1. A process of softening hard water by the precipitation therefrom of an amount of calcium carbonate and separate withdrawal of precipitated calcium carbonate and soft water, the process comprising the steps of rendering feed hard water alkaline by electrodialysis against a brine containing a water soluble alkali metal or calcium salt with periodical current flow reversal by passing said hard water and said brine through alternating product and brine compartments within a stack of asymmetric bipolar ion-exchange membranes so arranged that each brine compartment is bound by two cation-exchange layers and each product compartment is bound by two anion-exchange layers; withdrawing said alkaline hard water from the stack; mixing withdrawn alkaline hard water with fresh hard water to produce an alkaline diluate and subjecting said diluate to a crystallization inducing treatment by which calcium carbonate precipitation is induced; and recovering mother liquor from said precipitation as product soft water.

2. A process according to claim 1, wherein a brine solution is circulated through said brine compartments in said stack of asymmetric bipolar membranes each being in the form of a cell consisting of two asymmetric bipolar membranes whose cation-exchange layers face each other, attached with each other along peripheral regions, which cells are fitted with means for the ingress and egress of liquid.

3. A process according to claim 2, wherein cathode and anode compartments comprise an amount of active carbon.

4. A process according to claim 1 wherein cathode and anode compartments comprise an amount of active carbon.

5. A process according to claim 4, wherein both electrodes of the stack are filled with granulated active carbon.

6. A process according to claim 5, and further comprising sealing off both electrode compartments by an asymmetric bipolar membrane having an acid blocking anion-exchange layer facing the stack.

7. A process according to claim 4, wherein active carbon is slurried in the cathode and anode compartments.

8. A process according to claim 7, and further comprising sealing off both electrode compartments by an asymmetric bipolar membrane having an acid blocking anion-exchange layer facing the stack.

9. A process according to claim 4, and further comprising sealing off both electrode compartments by an asymmetric bipolar membrane having an acid blocking anion-exchange layer facing the stack.

10. A process according to claim 1, wherein said alkaline hard water mixed with fresh hard water is filtered across a calcium carbonate cake in said stop of crystallization inducing treatment.

11. A process according to claim 10, wherein said cake is comprised of calcium carbonate crystals of a size not exceeding 100 microns deposited on a filter.

12. A process according to claim 10, wherein a stream filtered in said step of crystallization inducing treatment is split in said recovery step into said product soft water and a stream recycled to said stack.

* * * * *